United States Patent [19]

Vanderpool et al.

[11] Patent Number: 4,578,518

[45] Date of Patent: * Mar. 25, 1986

[54] CATALYTIC (CALCINED CATALYST AND) PREPARATION OF LINEAR POLYETHYLENEPOLYAMINES (THEREWITH)

[75] Inventors: Steven H. Vanderpool, New Braunfels; Lewis W. Watts, Jr., Austin, both of Tex.

[73] Assignee: Texaco Inc., White Plains, N.Y.

[*] Notice: The portion of the term of this patent subsequent to Mar. 25, 2003 has been disclaimed.

[21] Appl. No.: 564,152

[22] Filed: Dec. 22, 1983

Related U.S. Application Data

[62] Division of Ser. No. 455,158, Jan. 3, 1983.

[51] Int. Cl.$^4$ ............................................. C07C 85/06
[52] U.S. Cl. ............................... 564/479; 564/485; 564/509; 564/512; 260/687 R
[58] Field of Search ............... 564/479, 485, 509, 512; 260/687 R

[56] References Cited

U.S. PATENT DOCUMENTS

| | | | |
|---|---|---|---|
| 2,824,073 | 2/1958 | Rylander et al. | 252/437 X |
| 3,297,701 | 1/1967 | Brader et al. | 260/268 |
| 3,342,820 | 9/1967 | Brader | 260/268 |
| 3,448,164 | 6/1969 | Holm et al. | 252/437 X |
| 4,018,706 | 4/1977 | Inoue et al. | 252/437 X |
| 4,036,881 | 7/1977 | Brennan et al. | 260/583 |
| 4,044,053 | 8/1977 | Brennan et al. | 260/583 |
| 4,103,087 | 7/1978 | Brennan | 544/78 |
| 4,314,083 | 2/1982 | Ford et al. | 564/479 |
| 4,316,840 | 2/1982 | Ford et al. | 260/239 |

FOREIGN PATENT DOCUMENTS

2092467 1/1982 United Kingdom .

OTHER PUBLICATIONS

A. Winkler & E. Thilo (Deutsche Akad. Will. Berlin, Germany), Z. Anurg Chem 346(1-2), 65 C.A. 14807c, 1966.

Brennan, U.S. application Ser. No. 453,841 filed 12/27/82, "Preparation of Linear Polyethylenepolyamines with Aluminum Phosphate Catalyst".

Primary Examiner—Charles F. Warren
Assistant Examiner—John A. Sopp
Attorney, Agent, or Firm—Robert A. Kulason; Jack H. Park; Kenneth R. Priem

[57] ABSTRACT

This invention is directed to thermally activated pelletted calcined catalyst compositions comprising titania having phosphorous derived from phosphoric acid deposited thereon and their use in the production of predominatly linear polyethylenepolyamines from ethylenediamine and monoethanolamine.

6 Claims, No Drawings

4,578,518

CATALYTIC (CALCINED CATALYST AND) PREPARATION OF LINEAR POLYETHYLENEPOLYAMINES (THEREWITH)

This is a division of application Ser. No. 455,158, filed Jan. 3, 1983.

BACKGROUND OF THE INVENTION

1. Technical Field of the Invention

This invention relates a continuous process for the preparation of predominatly linear polyethylenepolyamines from the starting reagents of ethylenediamine and monoethanolamine in the presence of a unique thermally activated pelleted calcined catalyst composition comprising titania having phosphorous derived from phosphoric acid deposited thereon.

2. Prior Art

Heretofore, polyethylenepolyamine compounds such as diethylenetriamine, triethylenetetramine and the higher homologs have been produced by the reaction of an alkyl halide such as ethylene dichloride with an amine such as ammonia or ethylenediamine at elevated temperatures and pressures. Normally, relatively high yields of predominatly non-cyclic polyethylenepolyamine compounds are obtained from this process with varying yields of heterocyclic amines. The large amounts of energy required to produce the reactants as well as the difficult separation procedures required to recover the more valuable linear polyethylenepolyamines diminish the usefulness of the ethylene dichloride process. The hydrohalide salts of ammonia and the polyethylenepolyamine products must also undergo difficult and time consuming caustic neutralization to yield the free polyethylenepolyamines.

It has heretofore been known that phosphates can be used to catalyze reaction products to produce predominately heterocyclic rather than linear products. Thus, U.S. Pat. No. 3,297,701 teaches the use of aluminum phosphate to catalyse the reaction of ethanolamines and polyethylenepolyamines to yield cyclic compounds. U.S. Pat. No. 3,342,820 discloses the use of aluminum phosphate for the preparation of heterocyclic compounds such as triethylenediamine. As another example, U.S. Pat. No. 4,103,087 also discloses the use of aluminum phosphate catalysts for producing heterocyclic product compounds.

More recently, investigators have found that more linear products can also be obtained in a catalyst conversion. Thus, Ford et. al. U.S. Pat. No. 4,316,840 discloses the preparation of polyalkylenepolyamines from ethylene diamine utilizing a metal nitrate or sulfate as a catalyst. U.S. Pat. No. 4,314,083 discloses the reaction of ethylene diamine with monoethanolamine to prepare noncyclic polyalkylenepolyamines using, as a catalyst, a salt of a nitrogen or sulfur-containing compound.

In inventions originating in our laboratories, Brennan et. al. in U.S. Pat. No. 4,036,881 discloses the use of phosphorous-containing catalysts to catalyze the reaction of ethylenediamine with monoethanolamine. Excellent results were obtained when the reaction was conducted in an autoclave. However, when the phosphorous compound was supported on silica or diatomaceos earth, good results were obtained only at comparatively low conversions. Brennan et. al. U.S. Pat. No. 4,044,053 is also relevant in this regard. A recently filed Brennan copending application Ser. No. 283,713, filed July 16, 1981 (now abandoned) and entitled "Preparation of Linear Polyethylenepolyamines With an Aluminum Phosphate Catalyst" is directed to an aluminum phosphate catalyst. Excellent results were obtained using a catalyst of this nature in batch-type reactions. Brennan U.S. Pat. No. 4,103,087 discloses the use of pelleted aluminum phosphate to prepare di-(N,N-disubstituted amino)alkanes.

Winkler et al. in a 1966 publication [Deutsche Akad. Wiss. Berlin, Germany, Z. Anorg. Allgen. Chem. 346 (1-2), 92–112 (1966)] disclose compounds of the general formula $HX^vP_2O_3$ wherein X represents arsenic, antimony and mixtures thereof. Also disclosed are compounds of the general formula $H_2X^{iv}P_2O_3$, wherein X represents silicon, germanium, tin, lead, titanium and zirconium. It is shown that the group IV phosphates have cation exchange properties.

Daniel Br. Apcn. No. 2,092,467 pub. Aug. 18, 1982, modifies iron phosphate catalysts disclosed in Cavaterra U.S. Pat. No. 3,948,959 for making methacrylic acid from isobutyric acid. Daniel uses such catalysts in admixture with a support prepared by calcining the dried powder recovered from a slurry of silica with phosphoric acid. Daniel teaches that the support is inert and that titania or zirconia can also be used.

SUMMARY OF THE INVENTION

A method of preparing novel catalyst compositions is disclosed. The catalyst is extremely useful in pelleted form in the continuous production of predominatly linear polyethylenepolyamines from ethylenediamine and monoethanolamine reactants. The novel catalyst of the claimed invention can be prepared by treating titania with phosphoric acid such that, in a thermally activated condition, the phosphorous is chemically bound to the titania. These novel compositions can be used to catalyze the reaction of monoethanolamine with ethylenediamine in a continuous process to provide essentially linear polyethylenepolyamine reaction products.

DETAILED DESCRIPTION

In one aspect the invention is directed to improved catalyst compositions comprising titania to which phosphorous derived from phosphoric acid has been chemically bonded by thermal activation. In another aspect such catalysts are used in producing essentially linear polyethylenepolyamines such as diethylenetriamine, triethylenetetramine, tetraethylenepentamine and pentaethylenehexamine from the reaction of ethylenediamine and monoethanolamine. The inventor is unaware of the precise structural differences between the claimed catalysts and previous phosphate catalysts that have been tried in such reactions, but is cognizant of substantially higher rates of conversion to linear polyethylenepolyamines with the claimed catalysts.

The catalyzed reaction of ethylenediamine with monoethanolamine can be conducted at a temperature of from about 250° C. to about 400° C., preferably from about 300° C. to about 350° C. and a pressure of from about 500 to about 3000 psig. and preferably from about 1000 to about 2000 psig. Higher pressures can be used, such as pressures up to about 10,000 psig., but there is no particular advantage in using higher pressures. The ratio of ethylenediamine to monoethanolamine may range from about 1:2 to about 5:1.

The pelleted catalyst compositions of the present invention are normally employed as a fixed bed of catalyst in a continuous reaction system. In a continuous process of this nature, the time of contact of the reactants with the catalyst is one of the interrelated factors that those skilled in the art will adjust, along with temperature, pressure, bed geometry, pellet size, etc. in order to obtain a desired rate of reaction and, hence, a desired percentage of conversion of the reactants. Thus, in a continuous process, it is not necessary to drive the reaction to completion because unreacted feedstock components can be recycled to the reactor.

It is customary to use cylindrically-shaped catalyst pellets having a diameter essentially equal to the length thereof, such as diameters and lengths ranging from about 1/32" to about ⅜". It will be understood that the shape and dimensions of the pellets are not critical to the present invention and that pellets of any suitable shape and dimensions may be used as desired, by one wishing to practice the process of the present invention.

When cylindrical pellets of catalyst of the type described above are used, the weighted hourly space velocity may be varied within wide limits (e.g., 0.1 to 5 w/hr/w) in order to obtain a desired rate of conversion, as explained above. Normally, space velocities of about 0.5 to 2 w/hr/w will be employed.

Catalyst life is an important factor in conducting a continuous reaction. For example, if a catalyst is easily poisoned, or if catalyst pellets do not have good structural properties, the economics of the process will be seriously and adversely affected.

The catalysts of the present invention are not particularly susceptible to poisoning so this normally does not present a problem. However, under the reaction conditions employed, amines of the type used and formed herein have the potential capability of leaching or otherwise adversely affecting the structural integrity of the pellets. In an extreme instance, catalyst pellets having good initial crush strength and surface hardness will be reduced to fines very rapidly when used under reaction conditions such as those employed herein.

It is a feature of the present invention that the pelleted catalyst compositions have improved resistance to physical degradation when used to catalyse the reaction of monoethanolamine with ethylenediamine.

The catalyst compositions of the present invention are prepared by treating titania with phosphoric acid to provide a phosphorous-containing catalyst composite. The composite is used in pellet form and is therefore calcined in accordance with the present invention. The titania can be pelletted either before or after treatment with phosphoric acid. Titania pellets can be prepared by extrusion or by compaction in conventional pelleting apparatus using a pelleting aid such as graphite.

When the catalyst composition is to be prepared by impregnating a preformed pellet, a suitable procedure to be used is to heat a liquid containing the liquid or liquifiable phosphorous compound at a temperature of about 100° to about 150° C. and to then add pellets in an amount about equal to the volume of the heated liquid. This treatment should be continued from about 0.5 to about 5 hours at this temperature range. At the end of that time, the resulting mixture of pellets and liquid may be cooled, decanted to remove excess liquid followed by washing with an amount of water adequate to substantially completely remove un-adsorbed liquid. Thereafter the composition may be dried. Temperatures above 150° C. can be used, if desired, but there is no particular advantage in doing so.

It will be understood that the phosphorous that is present on a thus-treated pellet is not present as elemental phosphorous, but rather as phosphorous that is chemically bound, preferably as an oxide, to the support. This is demonstrated by the fact that repeated washing will not remove all of the phosphorous. However, the exact nature of the bonding is not completely understood.

The amount of phosphorous that is bonded or otherwise adheres to the support is a function of heating and other conditions used in the treating step and is also a function of the chemical identity of the phosphorous compound that is used as a source of phosphorous. Under the treating conditions exemplified above, at least about 2.5 wt% of phosphorous is caused to bond or otherwise permanently adhere to the pellets. There is an upper limit to the amount of phosphorous that bonds or otherwise permanently adheres to the support. This upper limit is, as indicated, a function of both the treating conditions and the chemical used as a source of the phosphorous. Normally, the maximum amount of phosphorous that can be caused to bond or otherwise permanently adhere to the pellets is within the range of about 5 to 10 wt%.

The pellets are suitably calcined at a temperature of about 200° C. to about 800° C. for a period of time within the range of 2 to 24 hours; more preferably at a temperature of about 500° C. to about 700° C. for about 4 to 16 hours.

Other procedures can be used in adding phosphorous to the support. For example, the pellets can be treated with the phosphorous compound at ambient temperatures or at more modest elevated temperatures of less than about 100° C. In this situation, however, it is still necessary to thermally activate the treated pellets by calcining under the conditions recited above.

There are many compounds which can be formed from the reaction of ethylenediamine and monoethanolamine besides the preferred linear polyethylenepolyamines such as diethylenetriamine, triethylenetetramine, tetraethylenepentamine and pentaethylenehexamine. Less desirable cyclics and other compounds, such as piperazine, N-(2-aminoethyl)ethanolamine and N-(2-aminoethyl)piperazine, are also formed. The more desired linear polyethylenepolyamines can be easily recovered from the reaction product mixture by conventional methods such as distillation. Such distillation recovery methods are well known in the art. An outstanding advantage of the claimed invention is that the lower molecular weight polyethylenepolyamines recovered from the reaction mixture can be further reacted with monoethanolamine to produce a larger percentage of the higher molecular weight linear polyethylenepolyamines.

The following examples will further illustrate the preparation of predominantly linear polyethylenepolyamines from ethylenediamine and monoethanolamine by the use of the catalyst compositions of the present invention. They are given by way of illustration and not as limitations on the scope of the invention. Thus, it will be understood that reactants, proportions of reactants, and time, temperature and pressure of the reaction steps may be varied with much the same results achieved.

For purposes of convenience and brevity, the reactant compounds employed and the products obtained have been abbreviated in the following examples and tables. The abbreviations employed for these various compounds are:

EDA—ethylenediamine
MEA—monoethanolamine
PIP—piperazine

DETA—diethylenetriamine
TETA—triethylenetetramine
TEPA—tetraethylenepentamine
AEEA—N-(2-aminoethyl)ethanolamine
AEP—N-(2-aminoethyl)piperazine
HEP—N-(hydroxyethyl)piperazine

EXAMPLE I

1. Titania Catalyst Preparation

A series of pelleted catalysts were prepared by depositing phosphorous on a titania support.

Phosphoric Acid

Titania supported phosphoric acid catalysts were prepared by heating about 100 cc of phosphoric acid to about 130° C. under an inert atmosphere in a flask fitted with a condenser. 105 cc of titania pellets were slowly added through the condenser and the temperature was maintained for the desired period of time.

Thereafter the catalyst was recovered by first decanting the excess phosphoric acid followed by the addition to the pellets of a large quantity of water. The pellets and water were slowly stirred to dissipate heat. The pellets were washed several times with copious amounts of water and dried.

Thereafter the catalyst was dried and then calcined at 600° C. for the desired length of time.

For convenience, the catalyst prepared and a brief description of the same is set forth herein as Table I.

TABLE I

TITANIA CATALYST COMPOSITIONS

| Number | Composition |
|---|---|
| 5464-72 | 40 wt. % Phosphate on alumina |
| 5494-4 | Titania (TiO$_2$) |
| 5494-6 | Titania treated with phosphoric acid for 2 hours and then calcined at 600° C. for 16 hours |
| 5494-65 | Titania treated with phosphoric acid, pelletted and then calcined for 16 hours at 600° C. |

Preparation of Polyethylenepolyamines from Ethylenediamine and Monoethanolamine Using Calcined Titania-Supported Phosphorous Pelletted Catalysts The catalysts described in Table I were utilized for the conversion of ethylenediamine and monoethanolamine to a polyethylenepolyamine reaction product in a 100 cc continuous reactor system. Pellets were placed in the reactor and the feedstock that was fed to the reactor was a mixture of ethylenediamine and monoethanolamine in a molar ratio of about two moles of ethylenediamine per mole of monoethanolamine.

In order to obtain a basis for comparison, the reaction temperature was varied so as to obtain about a 65% conversion of the monoethanolamine feedstock.

The reaction product was periodically sampled and analyzed by gas chromatographic analysis of the crude reactor effluent. Results were calculated on a feed-free basis.

The catalysts tested and the results obtained in the series of tests are set forth in Table II. In general, each feedstock was run for at least 2½ hours to make sure that reaction conditions had stabilized.

Referring now to Table II it will be seen that the reference catalyst composition (5464-72) which comprised a commercially available 40 wt.% phosphate on aluminia catalyst of the type disclosed in Brennan U.S. Pat. No. 4,103,087 at column 8, lines 50–54 gave results which were improved upon in all instances. This run shows that with a pelleted aluminum phosphate catalyst, and in a continuous reaction, the results obtained are not so favorable as those reported for batch reactions in the copending application Ser. No. 283,713.

In particular, note that only about 77% of the triethylenetetramine fraction was noncyclic with this run. In contrast, with the catalyst of the present invention the noncyclic content was normally in excess of 90%. Note also that there was also a significantly smaller yield of diethylenetriamine with the reference catalyst.

The second reference test (5494-4) was with untreated titania pellets and it is seen that they were essentially inert insofar as conversion of monoethanolamine and ethylenediamine is concerned.

Thus, Table II demonstrates that with the calcined titania supported pelleted catalyst composition of the present invention in a continuous reaction system, it is possible to obtain excellent results in the reaction of monoethanolamine with ethylenediamine. The percentage of noncyclic reaction products is very high, being over 90%. Diethylenetriamine yields of from about 50 to about 70% were obtained with this group of catalysts. Uniformly good yields of triethylenetetramine were also obtained.

TABLE II

TITANIA SUPPORTED PHOSPHOROUS CATALYSTS

| Catalyst | Phosphorous on Cat. (wt. %) | Temp., 0° C. @ 65% MEA Conv. | Pip. | DETA | Selectivity AEEA | AEP & HEP | TETA | TEPA | Ratio: DETA/PIP | TETA % N.C. |
|---|---|---|---|---|---|---|---|---|---|---|
| 5464-72 | | 333 | 6.7 | 38.5 | 2.6 | 4.5 | 18.3 | 5.9 | 7.7 | 77 |
| 5494-4 | | — | — | — | — | — | — | — | — | — |
| 5494-6 | 2.1 | 325 | 2.8 | 59.0 | 0.7 | 2.1 | 19.6 | 4.2 | 19.7 | 96 |
| 5494-65 | | 301 | 3.8 | 64.4 | 0.5 | 3.7 | 20.5 | 2.5 | 17.0 | 92 |

Analysis of Catalyst Pellets

In an attempt to obtain a better understanding of the catalytic phenomena involved, three of the catalyst compositions were subjected to a detailed analysis utilizing a scanning electron microscope (SEM).

The catalyst pellets that were analyzed included catalyst composition 5494-6 (Table I) and also two reference compositions, namely, 5494-11 and 5494-13.

Catalyst composition 5494-11 was prepared by treating titania pellets with phosphoric acid, as described in Example I. However, in this instance, the pellets were next treated with concentrated aluminum nitrate, Al(NO$_3$)$_3$, by boiling the pellets in an aqueous solution of concentrated aluminum nitrate for 1 hour. The excess aluminum nitrate was then decanted. The pellets were washed with copious quantities of water, dried and then calcined in air for 16 hours at 600° C.

Catalyst composition 5494-13 was prepared as in Example I except that phosphoryl chloride was substituted for the phosphoric acid. The phosphoryl chloride was refluxed at 105° C. The heat was turned off and titania pellets were added at a rate adequate to maintain a strong reflux. When the resulting mixture was treated with water, the phosphoryl chloride was hydrolyzed.

The results of the first series of analyses is given in Table III attached. Note that with catalyst 5494-6, the phosphorus was concentrated in the initial 50 microns of the pellet surface.

In addition, the exterior surface at the end of the pellet was also analyzed and the results of this analysis are set forth in Table IV.

TABLE III

Analysis of $H_3PO_4/TiO_2/Calcined$ (5494-6)
Interior Surface of Fractured Pellet Weight % of Detected Elements

| Element | Outer Edge | 39μ in. | 50μ in. | 100μ in. | Center | 50μ in from opposite side | 10μ in from opposite side |
|---|---|---|---|---|---|---|---|
| Na | 2.4 | 0.7 | 0 | 0 | 0 | 0 | 1.5 |
| Al | 2.7 | 1.9 | 0 | 0 | 0 | 0 | 0 |
| Si | 3.4 | 1.5 | 0 | 0 | 0 | 0 | 0 |
| P | 35.3 | 10.8 | tr | tr | 0.2 | 0 | 20.4 |
| Cl | 5.3 | 2.1 | 0 | 0 | 0 | 0 | 0 |
| K | 7.3 | 2.0 | 0 | 0 | 0 | 0 | 0 |
| Ca | 1.9 | 1.6 | 1.5 | 0.9 | 2.0 | 2.0 | 0.5 |
| Ti | 41.7 | 79.3 | 98.5 | 99.1 | 97.8 | 98.0 | 77.6 |
|  | 100.0 | 99.9 | 100.0 | 100.0 | 100.0 | 100.0 | 100.0 |

Above data indicated that the phosphorus is concentrated at the surface of the catalyst pellet in a layer less than 50 microns thick.

TABLE IV

Analysis of $H_3PO_4/TiO_2/Calcined$ (5494-6), Continued
Exterior Surface (End) of Pellet Concentration, Weight % of Detected Elements

| Element | 1 | 2 | 3 | 4 | 5 | 6 | 7 |
|---|---|---|---|---|---|---|---|
| Na | 1.1 | 0.8 | 0.9 | 0.6 | 1.0 | 1.1 | 0.8 |
| Al | 0.1 | 0.2 | 0.7 | 0.1 | 3.2 | 3.3 | 0.2 |
| Si | 1.4 | 1.2 | 1.6 | 1.1 | 2.8 | 3.0 | 1.7 |
| S | 0 | 0 | 0 | 0 | 0 | 0 | 1.2 |
| Cl | 0 | 0 | 0 | 0 | 0 | 0 | 0.8 |
| K | 0 | 0 | 0 | 0 | 0 | 0 | 1.2 |
| Ca | 0 | 1.0 | 0.5 | 0.5 | 3.7 | 3.1 | 0.8 |
| Ti | 66.3 | 68.6 | 67.1 | 72.1 | 61.3 | 60.5 | 62.0 |
| P | 31.0 | 28.2 | 29.3 | 25.5 | 27.9 | 29.0 | 31.3 |
|  | 99.9 | 100.0 | 100.1 | 99.9 | 99.9 | 99.9 | 100.0 |

Above data indicate that the phosphorus concentration is relatively constant across the exterior surface of the pellet.

In respect of catalyst 5494-11, wherein the titania was treated with aluminum nitrate and phosphoric acid and then calcined, an analysis of the interior of the surface is given in Table V.

The scanning electron microscope analysis of the surface of catalyst 5494-11 is given in Table VI.

TABLE V

Analysis of $H_3PO_4/TiO_2/Al(NO_3)/Calcined$
Sample No. 4 (5494-11)
Interior Surface (Fractured) of Pellet Concentrations, Wt % of Detected Elements

| Element | 1 | 2 | 3 |
|---|---|---|---|
| Al | 2.5 | 0.88 | 1.5 |
| P | 1.7 | 0 | 0 |
| Ca | 1.2 | 0.82 | 1.5 |
| Ti | 94.6 | 98.3 | 97.0 |
|  | 100.0 | 100.0 | 100.0 |

Edge of fractured pellet was very rough, so that the closest analysis to the edge was 7 microns away. At this location, the "P" concentration was very low. Comparing this with data in Table VI, it is evident that the phosphorus exists within a very thin surface layer, much thinner than that for $H_3PO_4/TiO_2/calcined$, and that the "P" concentrations are lower than those for the $H_3PO_4/TiO_4/calcined$ catalysts.

TABLE VI

Analysis of $H_3PO_4/TiO_2/Al(NO_3)_3/Calcined$
Sample No. 4 (5494-11), Continued
Exterior Surface (End Face) of Pellet Concentration, Weight % of Detected Elements

| Element | 1* | 2 | 3 | 4 | 5 | 6 | 7 |
|---|---|---|---|---|---|---|---|
| Na | 0 | 0 | 0 | 0 | 0.4 | 0.3 | 0.1 |
| Al | 0 | 1.0 | 1.2 | 1.9 | 1.5 | 1.2 | 1.1 |
| Si | 0 | 0.4 | 0.4 | 0 | 0 | 0 | 0 |
| P | 5.3 | 12.5 | 10.8 | 12.5 | 15.8 | 10.0 | 12.9 |
| Ca | 0 | 0.5 | 0.6 | 1.0 | 0.8 | 0.2 | 0.7 |
| Ti | 94.7 | 85.6 | 87.0 | 84.7 | 81.6 | 88.3 | 85.3 |
|  | 100.0 | 100.0 | 100.0 | 100.1 | 100.1 | 100.1 | 100.1 |

*Values suspect

The above data indicate that "P" concentrations are relatively constant across the end surface of the pellet. 1 No reason can be offered for the low value on analysis #1. All "P" concentrations are lower than those for the $H_3PO_4/TiO_2/calcined$ catalysts.

In the case of the preceding analysis, it was demonstrated that the phosphorus was concentrated near the surface of the pellet. When catalyst 5494-13 was analyzed using the scanning electron microscope, different results were obtained, as is shown by Table VII.

TABLE VII

Analysis of $POCl_3/TiO_2$
Sample No. 5 (5494-13)
Interior (Fracture) Surface of Pellet Concentration, Wt % of Detected Elements

| Element | 1 | 2 | 3 | 4 | 5 |
|---|---|---|---|---|---|
| Si | 0.3 | 1.5 | 0.6 | 1.0 | 0.7 |
| P | 6.8 | 8.2 | 7.2 | 8.7 | 8.5 |
| Cl | 0.6 | 0.8 | 1.1 | 1.2 | 1.2 |
| K | 0.1 | 0 | 0 | 0 | 0 |
| Ca | 0.9 | 0.6 | 0.4 | 0.6 | 0.5 |
| Ti | 91.4 | 89.0 | 90.7 | 88.5 | 89.2 |
|  | 100.1 | 100.1 | 100.0 | 100.0 | 100.1 |

The above data indicate that the "P" concentration is approximately constant throughout the bulk of the catalyst particle, rather than being limited to a thin layer at the surface as in $H_3PO_4/TiO_2/calcined$ and $H_3POhd 4/TiO_2/Al(NO_3)_3/calcined$.

Further, when the exterior surface was analyzed, as set forth in Table VIII, it was found that the phosphorus was concentrated more in the interior of the catalyst than on the exterior. This demonstrates the need for caution when extrapolating from one catalyst composition to another in reactions of this nature.

TABLE VIII

Analysis of $POCl_3/TiO_2$
Sample No. 5 (5494-13) Continued
Exterior Surface (End) of Pellet Concentration, Wt % of Detected Elements

| Element | 1 | 2 | 3 | 4 | 5 |
|---|---|---|---|---|---|
| Si | 0.1 | 0.4 | 0.3 | 0.6 | 0.5 |
| P | 3.7 | 6.3 | 4.5 | 6.1 | 6.6 |
| Cl | 1.8 | 1.1 | 24.7* | 0.7 | 1.1 |
| Ca | 0.8 | 0.8 | 0.4 | 0.7 | 0.6 |

TABLE VIII-continued

Analysis of POCl$_3$/TiO$_2$
Sample No. 5 (5494-13) Continued
Exterior Surface (End) of Pellet

| Element | Concentration, Wt % of Detected Elements | | | | |
|---|---|---|---|---|---|
| | 1 | 2 | 3 | 4 | 5 |
| Ti | 93.7 | 91.5 | 70.1 | 91.9 | 91.2 |
| | 100.1 | 100.1 | 100.0 | 100.0 | 100.0 |

*Value suspect

The above data indicate the "P" is distributed rather evenly across the exterior surface of the catalyst pellet, but is lower in concentration on the surface than inside the pellet. It is interesting that the lowest "P" concentration above corresponds to the lowest concentration within the pellet.

The catalyst compositions were also analyzed by X-ray defraction in bulk and after being powdered.

The results of the X-ray examination indicated that the titania that was used was in a single phase, namely as anatase. Phosphating of the titania with phosphoric acid produced the well known compound Ti(HPO$_4$)$_2$.2H$_2$O. In addition, an unknown Ti-PO$_4$ compound was also detected. The X-ray defraction pattern was quite similar to that of three known triphosphates, namely AgTi$_2$(PO$_4$)$_3$, BaFeTi(PO$_4$)$_3$ and GeNb(PO$_4$)$_3$. Accordingly, the unknown was identified as a triphosphate possibly formed by the following reaction:

$$2TiO_2 + 2Ti(HPO_4)_3 \rightarrow 2HTi_2(PO_4)_3 + 2H_2O$$

Indexing of the unknown's pattern is given in Table IX, which follows:

TABLE IX

Indexing of Ti, PO$_4$ Unknown Pattern

| Intensity | d-Spacings, A | | Miller Indices |
|---|---|---|---|
| | Obsd | Calculated[1] | |
| w | 6.05 | 6.11 | (0.12) |
| w | 4.35 | 4.41 | (014) |
| w | 4.20 | 4.23 | (110) |
| m | 3.68 | 3.68 | (006) |
| s | 3.50 | 3.48 | (202) TiO$_2$ also |
| m | 3.32 | 3.29 | (106) |
| w | 3.22 | 3.16 | (007) |
| w | 3.03 | 3.05 | (024) |
| m | 2.75 | 2.75 | (211) |
| m | 2.03 | 2.04 | (036) |
| w | 1.95 | 1.96 | (128) |
| w | 1.83 | 1.84 | (0·0·12) |
| w | 1.60 | 1.60 | (140) |
| w | 1.28 | 1.28 | (514) |
| w | 1.25 | 1.25 | (3·1·14) |

[1]Calculated using $1/d = \sqrt{4/3(1/a^2)(h^2 + hk + k^2) + (1/c^2)l^2}$,
where hkl are Miller indices, a and c are lattice constants, 8.474 and 22.11A, respectively.

The X-ray defraction analysis studies further indicated that calcining converted essentially all of the Ti(HPO$_4$)$_2$.H$_2$O to the new compound. The crystal size of the latter was determined to be about 125A. However, with respect to catalyst 5494-11 it was found that only a part of the Ti(HPO$_4$)$_2$ was converted to the new compound. The new compound was not detected in sample 5494-13.

The results obtained from the catalyst pellet analysis are extremely interesting in a number of respects. First, it is clearly demonstrated that new catalyst compositions were obtained in the case of the samples 5494-6 and 5494-11. Otherwise the new phosphorus compound would not have been found.

The interaction between the phosphorus and the titania support will vary depending upon the chemical nature of the source of the phosphorus.

There are times when it is desirable to obtain greater yields of the higher polyethylenepolyamines such as triethylene tetramine on tetraethylenepentamine than those reported herein. In such instances, the diethylenetriamine can be recycled by substituting diethylenetriamine for all or a part of the ethylenediamine feedstock.

This specification includes data related to the invention disclosed and claimed herein and also, for comparative purposes, data is disclosed in this specification that is also disclosed and claimed in copending Vanderpool U.S. patent application Ser. No. 455,160, filed Jan. 3, 1983, of an even date herewith and entitled "Catalysts and Preparation of Linear Polyethylenepolyamines Therewith".

The foregoing examples of the present invention have been given by way of illustration only and are not intended as limitations on the scope of the invention which is defined by the following claims.

We claim:

1. In a method wherein monoethanolamine is reacted with ethylenediamine in the presence of a phosphorus containing catalyst to provide an essentially noncyclic product comprising polyethylenepolyamines, the improvement for conducting said process on a continuous basis which comprises:
    a. using, as a catalyst, thermally activated calcined pelleted titania containing titanium triphosphate and having thermally chemically bonded to at least the surface thereof about 0.5 to about 10 wt.% of phosphorus, said catalyst having been prepared by treating titania pellets with phosphoric acid for a period of time ranging from about 0.5 to about 5 hours, thereafter water washing, recovering and drying the thus-treated pellets and then calcining the pellets at about 200° C. to about 800° C. for about 1 to about 24 hours,
    b. continuously contacting a mixture of ethylene diamine and monoethanolamine in a molar ratio of about 1 to 5 moles of ethylenediamine per mole of monoethanolamine with said pelleted catalyst at a temperature of about 250° to about 400° C. and a pressure of about 500 to about 3000 psig. to obtain an essentially noncyclic reaction product.

2. A method as in claim 1, wherein the reaction product is fractionated to obtain at least a fraction comprising diethylenetriamine and wherein at least a portion of said diethylenetriamine is recycled to the reaction zone together with the said feedstock.

3. In a method wherein monoethanolamine is reacted with ethylenediamine in the presence of a phosphorus containing catalyst to provide an essentially noncyclic product comprising polyethylenepolyamines, the improvement for conducting said process on a continuous basis which comprises:
    a. using a catalyst prepared by treating titania pellets with phosphoric acid for a period of time within the range of about 0.5 to about 5 hours sufficient to thermally chemically bond from about 0.5 to about 10 wt.% of phosphorus to at least the surface of said pellets and to convert at least a portion of the titanium and phosphorous to titanium triphosphate, and thereafter water washing, recovering and drying the thus treated pellets and then calcining said pellets at about 500° to about 700° C. for about 4 to about 16 hours, continuously contacting a mixture of ethylenediamine and monoethanolamine in a molar ratio of about 1 to 5 moles of ethylenediamine per mole of monoethanolamine with said pelleted catalyst at a temperature of about 250° to about 400° C. and a pressure of about 500 to about 3000 psig. to obtain an essentially noncyclic reaction product.

4. In a method wherein monoethanolamine is reacted with ethylenediamine in the presence of a phosphorus containing catalyst to provide an essentially noncyclic product comprising polyethylenepolyamines, the improvement for conducting said process on a continuous basis which comprises:
  a. using, as the catalyst, a catalyst composition consisting essentially of thermally activated calcined pelleted titania containing titanium triphosphate and having thermally, chemically bonded to at least the surface thereof about 0.5 to about 10 wt.% of phosphorus, said catalyst having been prepared by impregnating titania pellets with phosphoric acid, heating the impregnated pellets at about 100° to about 150° C. for a period of time ranging from about 0.5 to about 5 hours, thereafter water washing, recovering and drying the thus-treated pellets and then calcining the pellets at about 200° C. to about 800° C. for about 1 to about 24 hours,
  b. continuously contacting a mixture of ethylene diamine and monoethanolamine in a molar ratio of about 1 to 5 moles of ethylenediamine per mole of monoethanolamine with said pelleted catalyst at a temperature of about 250° to about 400° C. and a pressure of about 500 to about 3000 psig. to obtain an essentially noncyclic reaction product.

5. A method as in claim 4, wherein the reaction product is fractionated to obtain at least a fraction comprising diethylenetriamine and wherein at least a portion of said diethylenetriamine is recycled to the reaction zone together with the said feedstock.

6. In a method wherein monoethanolamine is reacted with ethylenediamine in the presence of a phosphorus containing catalyst to provide an essentially noncyclic product comprising polyethylenepolyamines, the improvement for conducting said process on a continuous basis which comprises:
  a. using a catalyst prepared by a process consisting of the steps of impregnating titania pellets with phosphoric acid, heating the impregnated pellets at a temperature of about 100° to about 150° C. for a period of time within the range of about 0.5 to about 5 hours sufficient to thermally chemically bond from about 0.5 to about 10 wt.% of phosphorus to at least the surface of said pellets and to convert at least a portion of the titanium and phosphorous to titanium triphosphate, and thereafter water washing, recovering and drying the thus treated pellets and then calcining said pellets at about 500° to about 700° C. for about 4 to about 16 hours,
  b. continuously contacting a mixture of ethylene diamine and monoethanolamine in a molar ratio of about 1 to 5 moles of ethylenediamine per mole of monoethanolamine with said pelleted catalyst at a temperature of about 300° to about 350° C. and a pressure of about 1000 to about 2000 psig. to obtain an essentially noncyclic reaction product.

* * * * *